US012452677B1

(12) United States Patent
Shukla

(10) Patent No.: US 12,452,677 B1
(45) Date of Patent: Oct. 21, 2025

(54) MANAGING LOCATION-AWARE WIRELESS LOCAL AREA NETWORK (WLAN) PROFILES

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 18/077,935

(22) Filed: Dec. 8, 2022

(51) Int. Cl.
*H04W 12/63* (2021.01)
*H04L 1/00* (2006.01)
*H04W 12/06* (2021.01)

(52) U.S. Cl.
CPC ............ *H04W 12/63* (2021.01); *H04L 1/0061* (2013.01); *H04W 12/06* (2013.01)

(58) Field of Classification Search
CPC ...... H04W 12/63; H04W 12/06; H04L 1/0061
See application file for complete search history.

(56) References Cited

U.S. PATENT DOCUMENTS

| 2017/0126834 | A1* | 5/2017 | Fransen | H04L 67/303 |
| 2019/0104411 | A1* | 4/2019 | Hotchkiss | H04W 12/08 |
| 2021/0037060 | A1* | 2/2021 | Robison | H04L 63/123 |
| 2022/0188339 | A1* | 6/2022 | Lee | H04L 41/40 |

* cited by examiner

*Primary Examiner* — Azizul Choudhury
(74) *Attorney, Agent, or Firm* — Lowenstein Sandler LLP

(57) ABSTRACT

Technologies directed to the management of location-aware WLAN profiles are described. A wireless device can store instructions and data with a first environment identifier (EID) unique to a first physical location and a second EID unique to a second physical location. A processing device of the wireless device can generate a third EID at the first physical location and determine that the third EID matches the first EID. The wireless device connects to a first wireless network at a first physical location using a first network name and a first password associated with the first EID.

12 Claims, 7 Drawing Sheets

MANAGING LOCATION-AWARE WIRELESS LOCAL AREA NETWORK (WLAN) PROFILES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

A wireless mesh network may support establishing point-to-point wireless links between the participating communication devices. A network device may utilize the wireless mesh network to access digital content stored on one or more digital content servers within or outside the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to the management of location-aware WLAN profiles are described. Various devices are described herein that include wireless local area network (WLAN) radios that operate in the 2.4 GHz, 5 GHz U-NII-1, and 6 GHz bands and utilize various WLAN protocols, such as the Wi-Fi® protocols (e.g., 802.11n, 802.1 lac, or the like). When people carry their devices, such as tablets and e-readers, they may encounter the same network name (service set identifier (SSID)) with either different security settings or different passwords with the same security setting at different physical locations. For example, using "Guest" as a network name is pretty common, and many hotel chains keep the same SSID name but different passwords specific to a particular location. When a device attempts to connect to a first network in a first physical location, the device uses a previously saved WLAN profile, which includes a network name (e.g., SSID), associated password, security type, and optional user priority. When this device is used in another location with a second wireless network with the same network name ("Guest") but with a different password, the device fails to connect to the second wireless network. In this new location, the device cannot detect the password of the second wireless network ("Guest") since a different password is stored in the WLAN profile. The device can retry (scan, authentication, association, and failed key exchanges) a few times until an error message, at which point user intervention is needed to enter the password. This causes delay and frustration to a user while connecting to a network. A user would have to update their password every time they move between the two locations sharing the same network name SSID.

Aspects and embodiments of the present disclosure address the above and other deficiencies by providing a WLAN profile with environment identifiers (EIDs). The EID is unique to a given physical location and is associated with a saved WLAN profile, available in that particular physical location where the device is currently operating. Networks typically do not change in a given location, and a set of visible network names remains the same over multiple days. Aspects and embodiments of the present disclosure can generate an EID using the set of visible network names to uniquely identify the physical location. Aspects and embodiments of the present disclosure can generate an EID using a set of cyclic redundancy check (CRC) values of the set of visible network names. Aspects and embodiments of the present disclosure can generate an EID using geographic coordinates that uniquely identify the physical location. Aspects and embodiments of the present disclosure address the above and other deficiencies by providing a reliable way for wireless devices to identify an environment and connect to wireless networks having the same network name and different passwords and/or different security settings for the unique environment.

Figure 1:
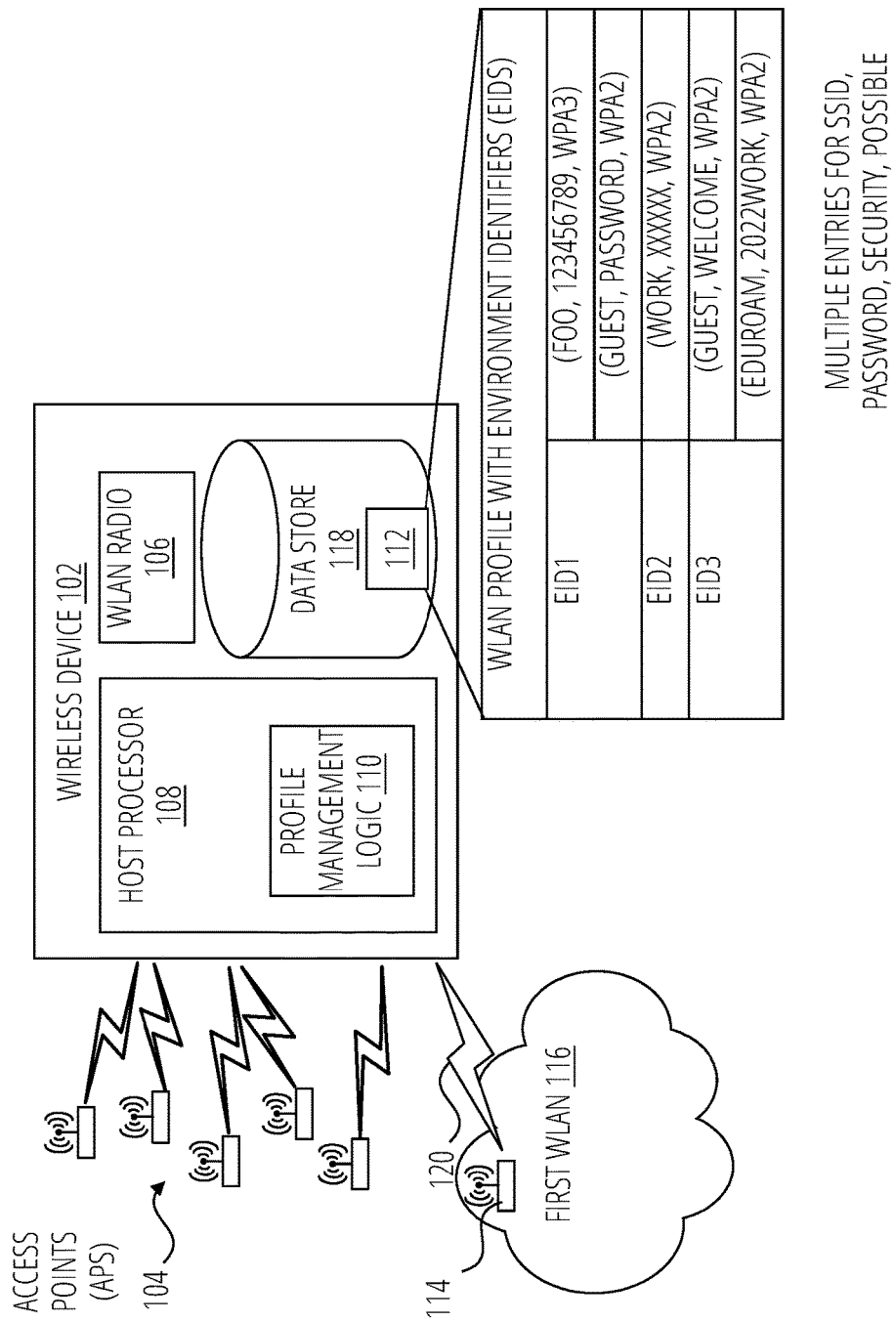
FIG. 1 is a network diagram of a wireless device in a first physical location according to at least one embodiment.

FIG. 1 is a network diagram of a wireless device 102 in a first physical location 100 according to at least one embodiment. The wireless device 102 can include various components, such as one or more processors (e.g., a host processor or central processing unit (CPU), one or more graphics processors, input-output (I/O) devices, memory devices, storage devices, or the like. In at least one embodiment, the wireless device 102 includes a circuit board, such as a printed circuit board (PCB), upon which one or more of the components described above is disposed. The components can be integrated into one or more integrated circuits. In some embodiments, the components can separate integrated circuits or chipsets In the illustrated embodiment, the wireless device 102 includes at least one WLAN radio 106 (e.g., Wi-Fi® radio) that operates at 2.4 GHz, 5 GHz, 6 GHz, or any combination thereof, a host processor 108, and a data store 118. The host processor 108 can execute profile management logic 110 or include circuitry that implements profile management logic 110 to manage one or more WLAN profiles with EIDs 112 stored in the data store 118. The wireless device 102 may connect to a WLAN using the WLAN radio 106 to obtain content from a server computing system (e.g., an item-providing system) or perform other activities. The wireless device 102 can connect to one or more different types of cellular networks, personal area networks (PANs), in addition to the WLAN (e.g., Wi-Fi® networks). In some embodiments, the wireless device 102 connects to an AP, which provides access to the Internet, a private network, or other public networks. In at least one embodiment, the wireless device 102 includes one or more additional radios, such as a PAN radio (e.g., BLE or Bluetooth® classic technology), a cellular radio, or the like. In at least one embodiment, a second radio can be used to communicate information between the wireless device 102 and the other wireless devices.

In at least one embodiment, the host processor 108 can establish a first wireless connection 120 with the first network device 114 using the WLAN radio 106. More specifically, the wireless device 102 can be presented with multiple SSIDs corresponding to the access points (APs) 104, including the SSID for the first network device 114. Selection logic can select which of the APs to connect using a set of AP selection rules. The host processor 108 can also establish one or more additional wireless connections with other devices using the WLAN radio 106 or other radios. In at least one embodiment, the wireless device 102 can connect to a first network device 114 that provides a first AP of a first WLAN 116 to the wireless device 102 and Internet access over one or more networks, such as one or more public or private networks (not illustrated in FIG. 1). The wireless device 102 can establish a first wireless connection 120 with the first network device 114. The first network device 114 can be connected to a gateway or a modem via a wired or wireless connection. Alternatively, the first network device 114 can be a router or a gateway and can provide internet access to wireless device 102 as well as other devices in the first WLAN 116 (not illustrated in FIG. 1). In addition, the wireless device 102 can connect to other APs 104 at the first physical location 100. In at least one embodiment, the first network device 114 can fetch media data, such as audio or video data, from the Internet and distributes the media data over the air to the wireless device 102.

As illustrated in FIG. 1, the wireless device 102 can include profile management logic 110 that manages one or more WLAN profile(s) with EIDs 112. The wireless device 102 can generate EIDs for distinct locations to be stored in one or more tables of the data store 118. The data store 118 can store instructions of the profile management logic 110 that manages one or more WLAN profiles with EIDs 112. The data store 118 can include a database with multiple entries, each entry including i) an EID, ii) a network name, iii) a password, iv) a security setting, and v) an optional user priority setting. Alternatively, the entries can include additional information as described herein. The profile management logic 110 can store a WLAN profile with EIDs 112 that provides i) the ability to make use of multiple networks sharing the same SSID but different passwords at distinct locations, without the need to re-enter password every time, and 2) faster detection of a change in environment and therefore avoid connection errors as described above.

As described above, the wireless device 102 is responsible for AP selection when presented with multiple network names (e.g., SSIDs) of the access points (APs) 104, including a first network name of the first WLAN 116. The wireless device 102 can utilize the profile management logic 110 in connection with the AP selection and connection processes. The APs 104 can be provided by a wireless or wired device. These devices can be hard-wired or otherwise connected to a cable modem that provides Internet access. A single device can provide multiple APs 104, where each of the APs 104 is associated with a network name (e.g., SSID). In at least one embodiment, the wireless device 102 can identify that the wireless device 102 is located in a physical environment/location (e.g., the first physical location 100) when connecting to an AP using an EID. An EID is unique to a given physical location and is associated with the saved WLAN profile with EIDs 112, available in the location where the device is currently operating.

In at least one embodiment, the profile management logic 110 can identify the physical location using visible networks that uniquely identify the environment. When the wireless device 102 is operating in the first physical location 100, the WLAN radio 106 can perform a network scan to discover a set of available wireless networks, including SSIDs from the access points (APs) 104 and the first network device 114. These available networks typically do not change in a given location, remaining more or less the same across a long period of time (e.g., days, weeks, or months). The set of visible network names could be used by the profile management logic 110 to identify a unique EID for the first physical location 100 where the wireless device 102 is operating. The profile management logic 110 can store this unique EID in the WLAN profile with EIDs 112 stored in the data store 118. All the configured available networks used by the device can be associated with the unique EID computed for the first physical location 100. The unique EIDs, which are specified to their respective physical locations, allow the wireless device 102 to store multiple WLAN profiles or multiple entries in a WLAN profile with the same network name (e.g., same SSID), but with different passwords, different security settings, or both.

For comparison, an existing WLAN profile can only store one password and security setting for a given SSID, as illustrated in the following Table 1. For example, there can only be one entry with the network name "Guest."

TABLE 1

Wi-Fi Profile (existing)

(foo, 123456789, WPA3)
(Guest, password, WPA2)
(Work, XXXXXX, WPA2)

However, the WLAN profile with EIDs 112 can have multiple entries with the same network name, where the passwords, security settings, or both are different, as illustrated in Table 2.

TABLE 2

Wi-Fi Profile with Environment Identifiers (EIDs)

| EID1 | (foo, 123456789, WPA3) |
| | (Guest, password, WPA2) |
| EID2 | (Work, XXXXXX, WPA2) |
| EID3 | (Guest, Welcome, WPA2) |
| | (eduroam, 2022Work, WPA2) |

Table 2 shows how the WLAN profiles are managed by the profile management logic 110, with associated EIDs. Conventional WLAN profiles in a device can only maintain one entry for a given SSID password. Using the profile management logic 110 and WLAN profile with EIDs 112, the wireless device 102 can maintain multiple entries for the same network name SSID in different locations. For example, the network name "Guest" uses a first password, "password," in a first physical location identified by EID1, whereas when wireless device 102 is used in a second physical location identified by EID3, it uses a second password, "Welcome" for the same network name Guest. The profile management logic 110 and WLAN profile with EIDs 112 allow the wireless device 102 to seamlessly move across different physical locations without conflicts with WLAN profiles.

In at least one embodiment, the wireless device 102 includes one or more WLAN radios, a memory device that stores instructions and a WLAN profile, and a processing device, operatively coupled to the memory device and the one or more WLAN radios, that executes the instructions to perform operations. At a first time, the wireless device 102 generates a first EID at a first physical location using a first set of available wireless networks at the first physical location. The wireless device 102 can receive a first SSID of a first wireless network of the first set of available wireless networks and a first password associated with the first wireless network. The wireless device 102 can store the first EID, the first SSID, and the first password in the WLAN profile. At a second time after the first time, the wireless device 102 can generate a second EID at a second physical location using a second set of available wireless networks at the second physical location. The wireless device 102 can receive a second SSID of a second wireless network of the second set of available wireless networks and a second password associated with the second wireless network. The wireless device 102 can store the second EID, the second SSID, and the second password in the WLAN profile. The first SSID and the second SSID are the same. At a third time after the second time, the wireless device 102 can generate a third EID at the first physical location using a third set of available wireless networks at the first physical location. The wireless device 102 can determine that the third EID matches the first EID. The wireless device 102 can connect to the first wireless network using the first SSID and the first password associated with the first EID. In at least one embodiment, the first set of available wireless networks and the second set of available wireless networks are different, the first EID is unique to the first physical location, and the second EID is unique to the second physical location.

In at least one embodiment, the wireless device 102 can generate the first EID by discovering the first set of available wireless networks during a first network scan and generating a first value using an n-bit bloom filter using an SSID of each wireless network of the first set of available wireless networks. The first value is the first EID. The wireless device 102 can generate the third EID by discovering the third set of available wireless networks during a second network scan and generating a second value using the n-bit bloom filter using an SSID of each wireless network of the third set of available wireless networks. The second value is the third EID.

In at least one embodiment, the wireless network could be from a peer-to-peer (P2P) device, such as TVs, remote controls, etc., that advertise SSID "Direct-XXX." Basically, any network that advertises an SSID can be used for environment identification (e.g., fingerprinting), not just APS. Additional details of the profile management logic 110 and WLAN profile with EIDs 112 are described below with respect to FIG. 2A to FIG. 6.

The wireless device 102 can be any electronic device to wirelessly connect to one or more access points 104 (APs), such as a router, a gateway, a mesh node, or other network devices. The wireless device 102 can be a client device, an endpoint device, a station (STA), or the like, with respect to the APs 104, but it can also be a device that provides an AP. The wireless device 102 can be a computer, a smartphone, a voice-controlled device, a wireless display, a wireless speaker, a game console, a wireless gamepad, a wearable device, a robot-based device, an Internet of Things (IoT) device, a portable computing device, a content rendering device that includes a modem for connecting the user device to a network, electronic book readers, portable digital assistants, mobile phones, laptop computers, portable media players, tablet computers, cameras, video cameras, netbooks, notebooks, desktop computers gaming consoles, Blu-ray® or DVD players, media centers, drones, audio-input-enabled devices, speech-based personal data assistants, voice control and speaker devices, smart switches, smart bulbs, remotes, televisions, television set-top boxes, television dongles, or the like. The wireless device 102 may also be an audio-input-enabled device, such as the Amazon Echo device, developed by Amazon Technologies, Inc. of Seattle, WA. Alternatively, the wireless device 102 may be a set-top box (STB) or other media-streaming devices.

In other embodiments, the components can reside on a common carrier substrate die of an integrated circuit. For example, the first wireless device 260 can include a processing element, one or more radios, including a baseband processor, and radio frequency (RF) front-end circuitry. The baseband processor can generate RF signals to radiate electromagnetic energy via one or more antennas. In some cases, the baseband processor and other circuitry can be implemented in an RF module, such as a chipset implementing the Wi-Fi® technology. In addition to the baseband processor, the first wireless device 260 can also include an application processor (AP) that implements other operations of the first wireless device 260. In another embodiment, an application-specific integrated circuit (ASIC), a field-programmable gate array (FPGA), or other mixed-signal integrated circuits may be used to implement the operations described herein. In one embodiment, the baseband processor includes one or more transceivers operating at 2.45 GHz and 5 GHz. The baseband processor can implement the Wi-Fi® technology.

It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connect to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may include receivers and/or transmitters, filters, amplifiers, mixers, switches, and/or other electrical components. The RF circuitry may be coupled to a modem that allows the user device to manage both voice and non-voice communications (such as communications for text messages, multimedia messages, media downloads, web browsing, etc.) with a wireless communication system. The modem may provide network connectivity using any type of digital mobile network technology, including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity.

Figure 2A:
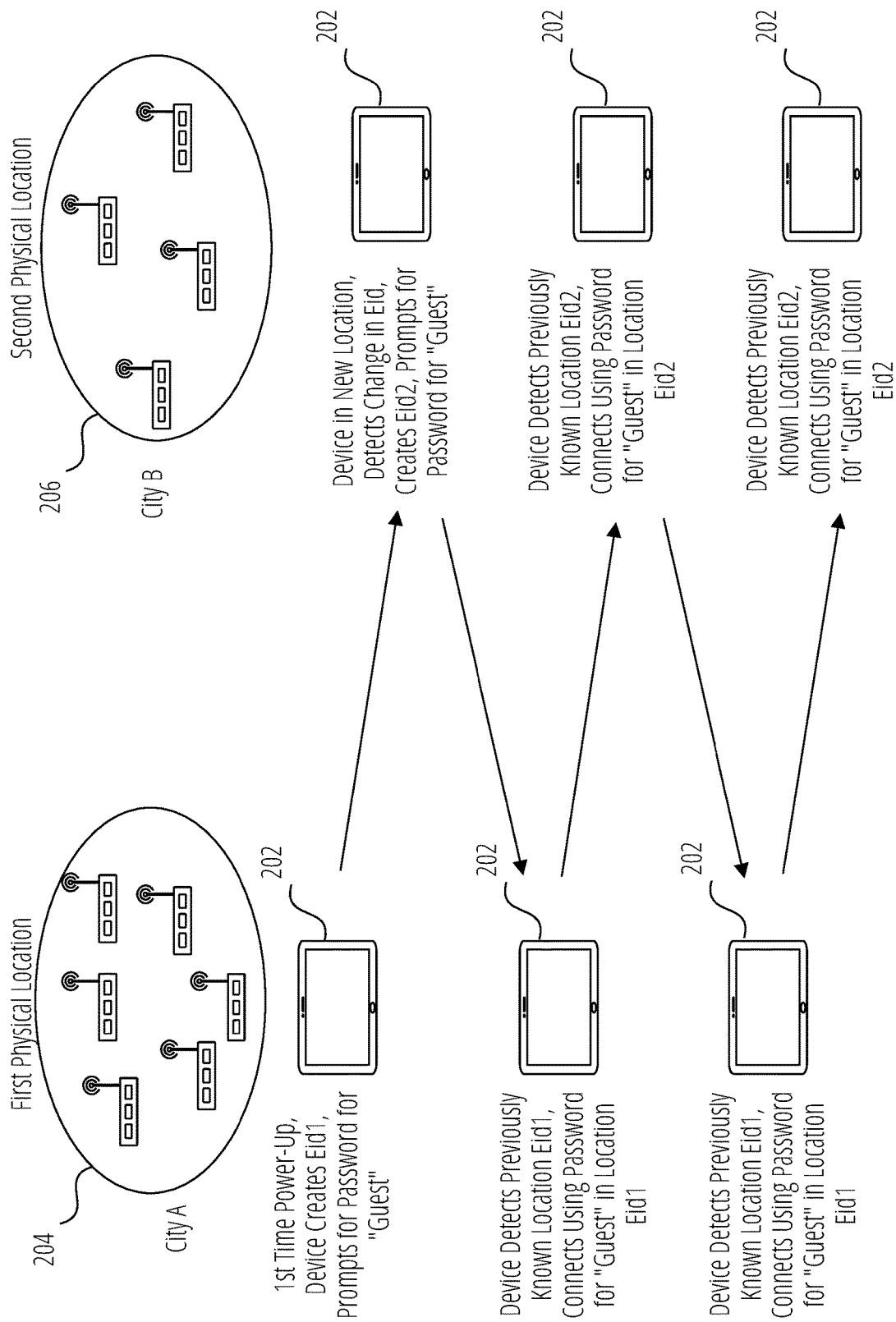
FIG. 2A is a functional diagram illustrating a wireless device traveling between two physical locations and seamlessly connecting to two wireless networks having the same network names according to at least one embodiment.

FIG. 2A is a functional diagram illustrating a wireless device 202 traveling between two physical locations and seamlessly connecting to two wireless networks having the same network names according to at least one embodiment. The wireless device 202 can be similar to the wireless device 102 of FIG. 1. The first time wireless device 202 powers up or enters a first physical location 204 (e.g., City A), the wireless device 202 generates a first EID (EID1) to uniquely identify the first physical location 204. When the wireless device 202 attempts to connect to a first wireless network with a network name of "Guest," the wireless device 202 prompts a user for a first password. The wireless device 202 stores the first EID and the first password for the first wireless network. In general, when the wireless device 202 attempts to connect, it first identifies which EID the wireless device 202 belongs to and picks the corresponding WLAN profile to connect using the EID.

As the wireless device 202 travels to a second physical location 206 (e.g., City B), the wireless device 202 detects a change in EID and generates a second EID (EID2) for the second physical location 206. When the wireless device 202 attempts to connect to a second wireless network with the same network name of "Guest," the wireless device 202 prompts a user for a second password. The second password can be a different password than the first password. The wireless device 202 stores the second EID and second password for the second wireless network. In general, when the wireless device 202 detects a change in EID, the wireless device 202 can seamlessly connect to the associated WLAN profile for the given location, as it uses the correct password for the respective wireless network having the same network name as another wireless network in another location per the deduced EID. Guest password the device seamlessly connects to the associated Wi-Fi profile, as it picks up the right Guest password as per deduced EID.

As the wireless device 202 travels back to the first physical location 204 (e.g., City A), the wireless device detects the change in EID to be a previously known location corresponding to the first EID (EID1). The wireless device 202 connects to the first wireless network using the corresponding WLAN profile for the first physical location 204, including the first password for the Guest network name at the first physical location 204.

As the wireless device 202 travels back to the second physical location 206 (e.g., City B), the wireless device detects the change in EID to be a previously known location corresponding to the second EID (EID2). The wireless device 202 connects to the second wireless network using the corresponding WLAN profile for the second physical location 206, including the second password for the Guest network name at the second physical location 206. The wireless device 202 can seamlessly connect to the two wireless networks having the same name and located at two different physical locations using the unique EIDs, unlike a conventional wireless device without the profile management logic 110 and WLAN profile with EIDs 112, as described below with respect to FIG. 2B.

Figure 2B:
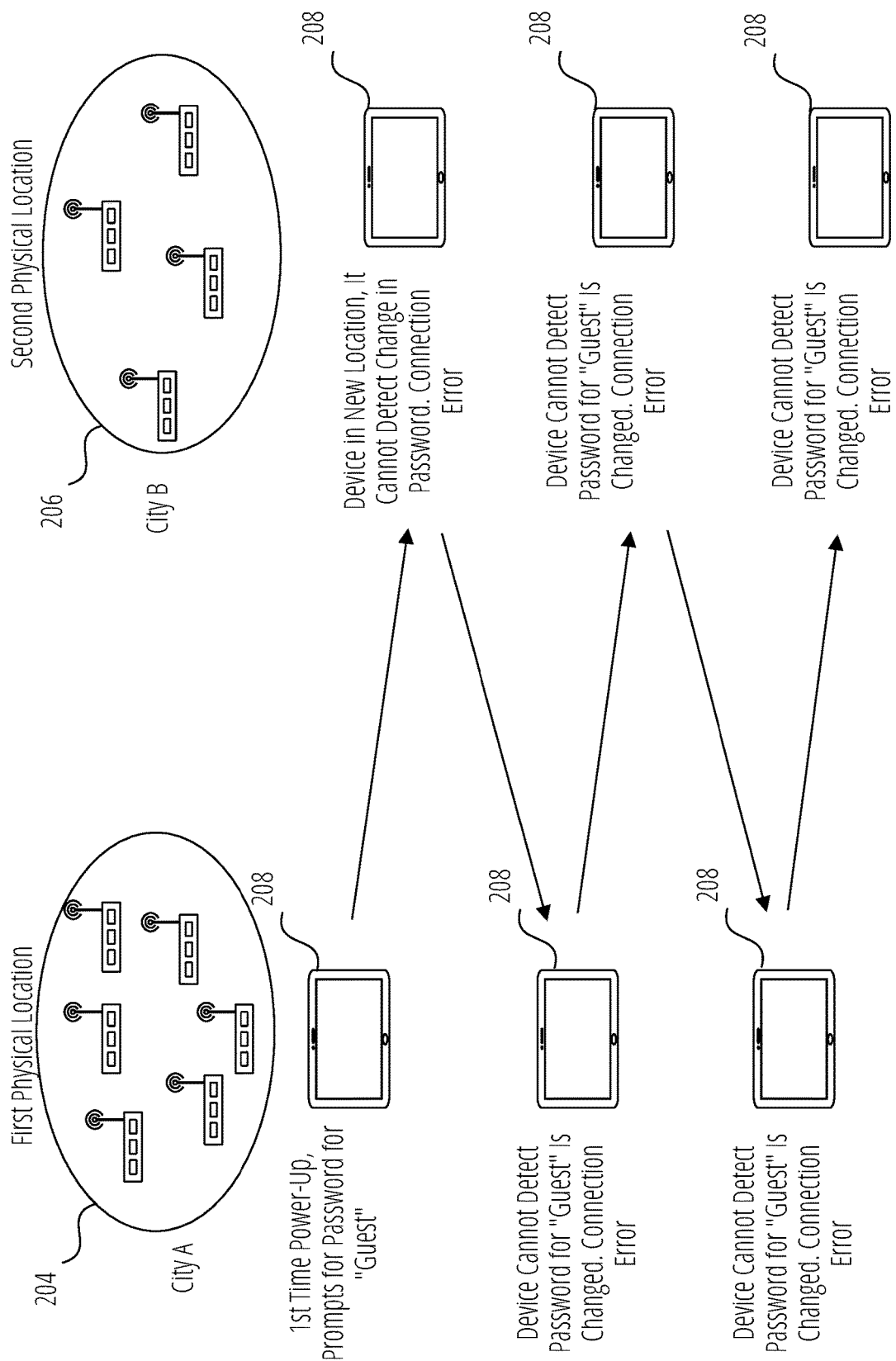
FIG. 2B is a functional diagram illustrating a conventional wireless device traveling between two physical locations and attempting to connect to two wireless networks having the same network names according to at least one implementation.

FIG. 2B is a functional diagram illustrating a conventional wireless device traveling between two physical locations and attempting to connect to two wireless networks having the same network names according to at least one implementation. When the conventional wireless device 208 is in the first physical location 204 (e.g., City A) and attempts to connect to the first wireless network with a network name of "Guest," the conventional wireless device 208 prompts a user for a first password. The conventional wireless device 208 stores a WLAN profile with the network name and first password.

As the conventional wireless device 208 travels to the second physical location 206 (e.g., City B) and attempts to connect to the second wireless network with the same network name of "Guest," the conventional wireless device 208 uses the WLAN profile with the network name "Guest" and the first password. However, the conventional wireless device 208 cannot detect the change in password to the second password and uses the first password incorrectly. As a result, the conventional wireless device 208 tries to reconnect using the same information and eventually experiences a connection error. When the connection error is detected, the conventional wireless device 208 can prompt the user for the second password. The conventional wireless device 208 stores the network name "Guest" and the second password in the WLAN profile.

As the conventional wireless device 208 travels back to the first physical location 204 (e.g., City A) and attempts to connect to the first wireless network "Guest," the conventional wireless device 208 uses the WLAN profile with the network name "Guest" and the second password. However, the conventional wireless device 208 cannot detect the password change back to the first password and uses the second password incorrectly. As a result, the conventional wireless device 208 tries to reconnect using the same information and eventually experiences a connection error. When the connection error is detected, the conventional wireless device 208 can prompt the user for the first password again. The conventional wireless device 208 stores the network name "Guest" and the first password in the WLAN profile. This problem repeats as the conventional wireless device 208 travels back and forth between the two physical locations. The user is required to re-enter the password each time after a significant delay caused by multiple attempts to connect with the incorrect network credentials. Without the profile management logic 110 and WLAN profile with EIDs 112, the conventional wireless device 208 would always experience a connection error, and a password would need to be entered upon a change in the city or location.

Figure 3:
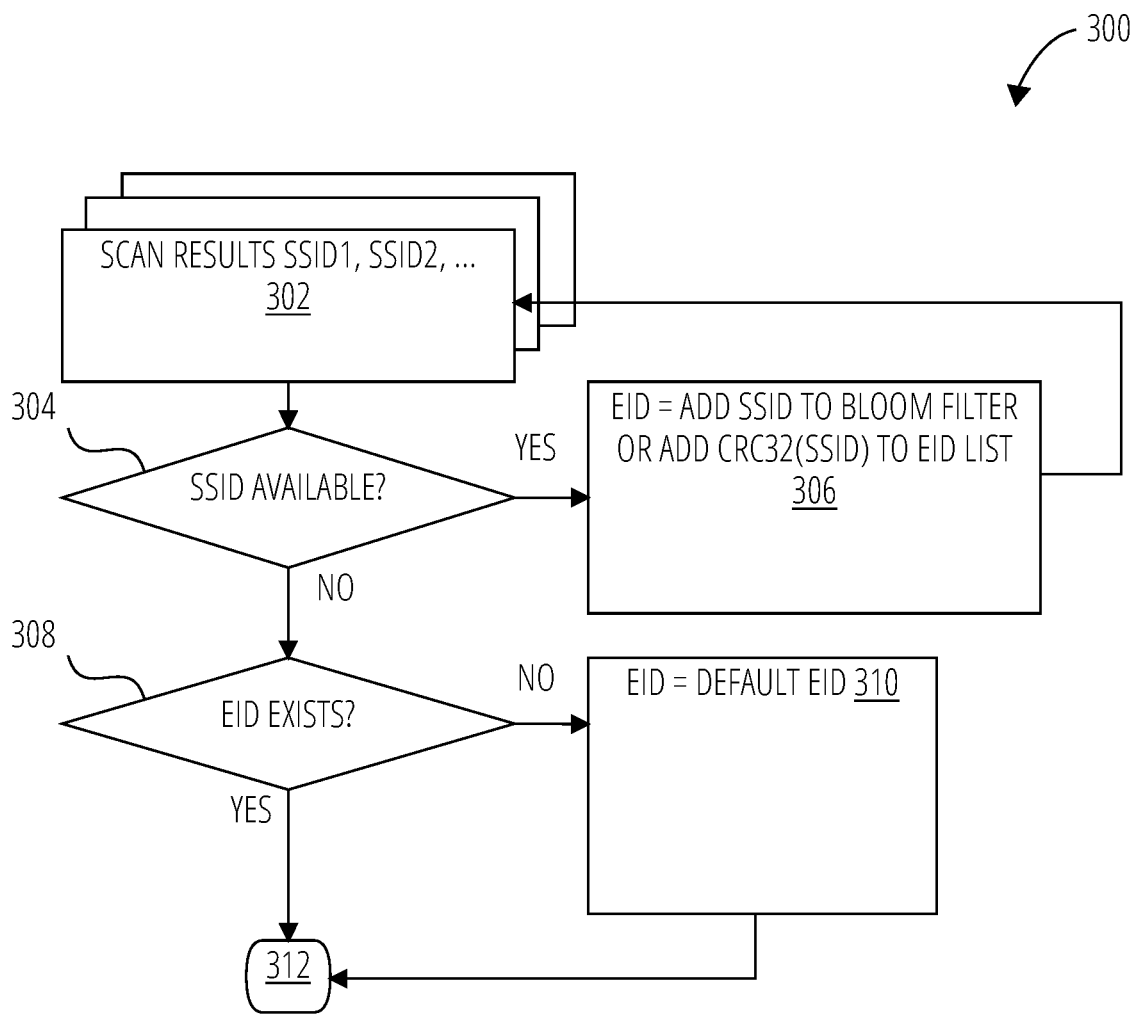
FIG. 3 is a flow diagram of a method of generating EIDs according to at least one embodiment.

FIG. 3 is a flow diagram of a method 300 of generating EIDs according to at least one embodiment. The method 300 may be performed by processing logic that comprises hardware (e.g., circuitry, dedicated logic, programmable logic, microcode, etc.), software, firmware, or a combination thereof. In one embodiment, the profile management logic 110 of FIG. 1 performs the method 300. In another embodiment, the wireless device 102 of FIG. 1 performs the method 300. In another embodiment, the WLAN radio 106 of FIG. 1 performs the method 300. In another embodiment, the wireless device 202 of FIG. 2A performs the method 300. Alternatively, other devices described herein can perform the method 300.

Referring to FIG. 3, the method 300 begins with the processing logic obtaining scan results from a network scan in which wireless networks are discovered (block 302). The scan results can include an SSID for each wireless network discovered. At block 304, the processing logic determines if a discovered SSID is available from the scan results. If an SSID is available at block 304, the processing logic adds the SSID to a bloom filter, also referred to as an n-bit bloom filter, to generate an EID (block 306) and returns to block 302 to determine if there are any additional SSIDs in the scan results. The bloom filter is a probabilistic data structure with a bit array of N bits, where N is the size of the bit array. The bloom filter also has a number of hash functions, k. These hash functions can set bits in the bit array based on the inputs. The bloom filter produces a unique value based on each of the SSIDs discovered in the scan results at block 302. The final value generated by the bloom filter can be used for the EID for the physical location at which the network scan was performed. If no additional SSIDs are available at block 304, the processing logic determines if an EID exists (block 308). If an EID exists (i.e., an EID is generated at block 306), the processing logic ends the method 300 (block 312). If no EIDs exist at block 308, the processing logic can generate or retrieve a default, special, or pre-known EID that identifies that the wireless device does not have an existing EID (block 310) before the processing logic ends at block 312.

As described above, the EID can be generated using an n-bit bloom filter. The number of bits n and the number of hash functions of the bloom filter are subject to available memory and required precision. During a connection process, the processing logic performs the network scan looking for available networks (e.g., visible networks). In the network scan step, the EID can be generated. For each detected network, its SSID is fed into the n-bit bloom filter, and at the end of the network scan, the value of the n-bit bloom filter is used as EID for that location. A special EID value is defined to identify cases when a device does not have an existing EID, e.g., a freshly bought device or device after a factory reset. The EID can be generated during an Out-of-box experience (OOBE) or whenever a network profile is added. At these times, there are no stored WLAN profiles on the device. The device can compute an EID at the time of the network scan. The SSID is fed into the bloom filter as the device gets scan results. At the end of the scan, the device has a bloom filter that captures all the known networks during the scan. The device stores this bloom filter as the EID for the network added during OOBE or the settings page.

In other embodiments, other types of probabilistic data structures can be used, such as Count-Min (CM) Sketch, Filtered-Space Savings (FSS) Top-K, HyperLogLog (HLL), T-Digest, or the like. The n-bit bloom filter is memory space-efficient. An n-bit bloom filter can be used for each physical location.

Figure 5:
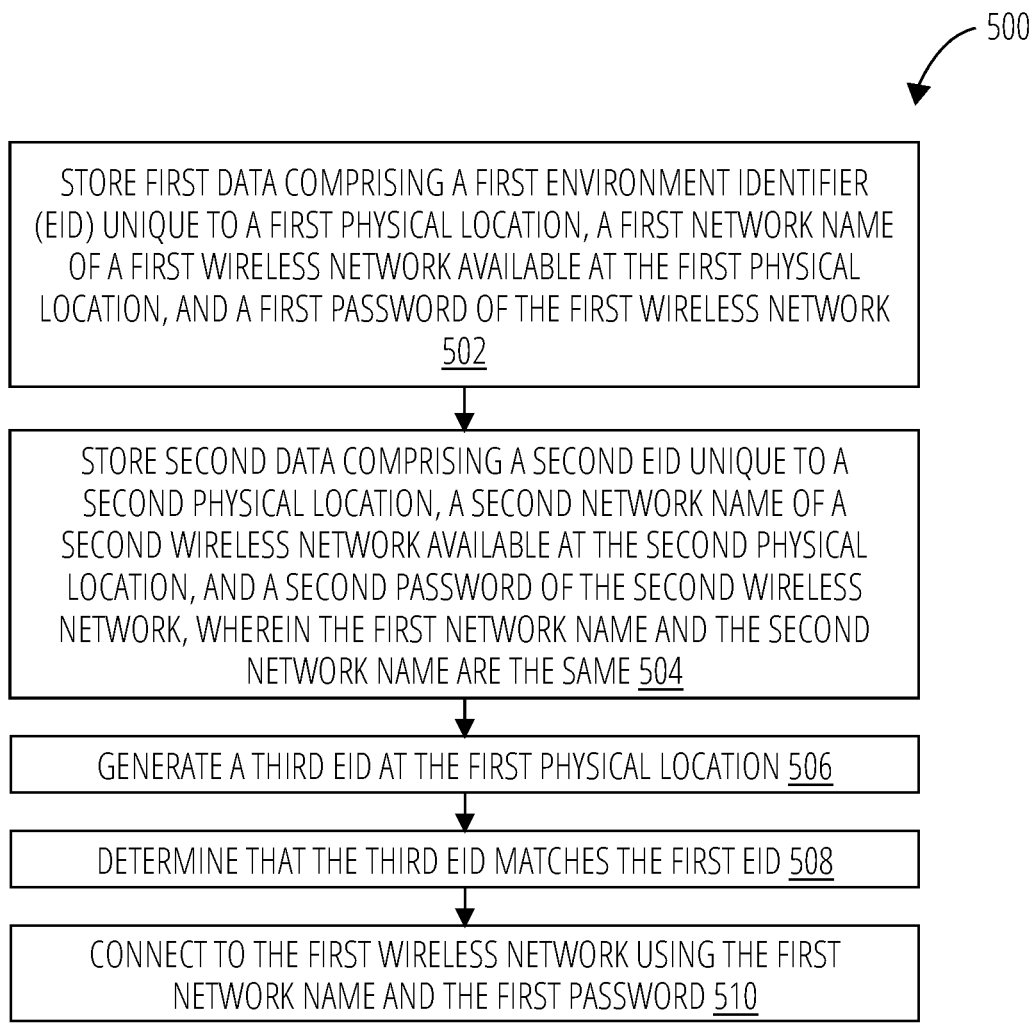
FIG. 5 is a flow diagram of a method of using EIDs to connect to a wireless network according to at least one embodiment.

As described herein, the EID can be a bloom filter or a concatenated list of CRC values of SSIDs. In at least one embodiment, the EID is an n-bit bloom filter associated with a physical location. That is, the device can store multiple n-bit bloom filters, each associated with one of the different physical locations. The n-bit bloom filter can provide a type of fingerprint of the physical location based on the available wireless networks at the physical location. In at least one embodiment, a special value (e.g., NULL_EID) can indicate that there is no valid EID. This can be stored at first-time power-up of the device, for example. During a connection process, the discovered SSIDs (network names) are matched against all EIDs, such as determining membership in a bloom filter when EID is an n-bit filter or finding CRC (SSID) in the EID when EID is the concatenated list of CRC values. If there is a match, a corresponding counter value (match count) is incremented, as illustrated in FIG. 5. Otherwise, the counter value (match count) is not incremented. When all SSIDs are done, the device selects the EID that has a maximum value of associated match counts that exceed a percentage (e.g., 50%) of total detected networks. Otherwise, if no match or no match count that exceeds the percentage, the device creates a new EID.

In another, instead of using a bloom filter, the processing logic can use a cyclic redundancy check (CRC) to generate a CRC value of the SSID value and add the CRC value to an EID list at block 306. Alternatively, other methods to generate EIDs can be used at block 306. Another method to generate an EID is described below with respect to FIG. 4.

Figure 4:
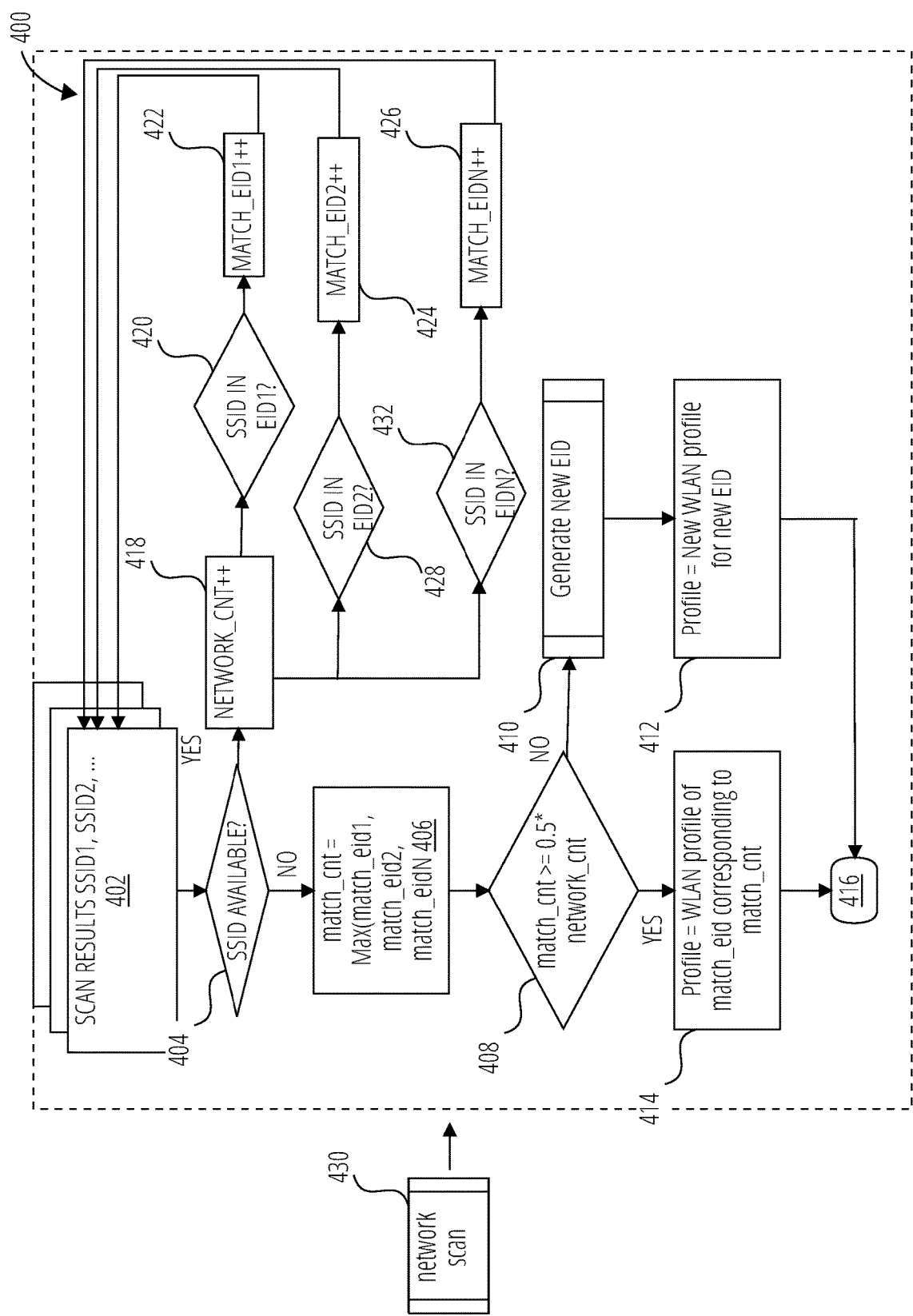
FIG. 4 is a flow diagram of a method of matching EIDs according to at least one embodiment.

FIG. 4 is a flow diagram of a method 400 of matching EIDs according to at least one embodiment. The method 400 may be performed by processing logic that comprises hardware (e.g., circuitry, dedicated logic, programmable logic, microcode, etc.), software, firmware, or a combination thereof. In one embodiment, the profile management logic 110 of FIG. 1 performs the method 400. In another embodiment, the wireless device 102 of FIG. 1 performs the method 400. In another embodiment, the WLAN radio 106 of FIG. 1 performs the method 400. In another embodiment, the wireless device 202 of FIG. 2A performs the method 400. Alternatively, other devices described herein can perform the method 400.

Referring to FIG. 4, the method 400 begins with the processing logic obtaining scan results from a network scan 430 in which wireless networks are discovered (block 402). The scan results can include an SSID for each wireless network discovered. When a device has WLAN profiles and associated EIDs, the device has to identify which EID's WLAN profiles match a current environment. At block 404, the processing logic determines if a discovered SSID is available from the scan results. If an SSID is available at block 404, the processing logic starts a network counter (block 418). The network counter value can identify a total number of wireless networks discovered in the scan results of the network scan 430. The SSID is also fed into each bloom filter for each EID at blocks 420 (EID1), 428 (EID2), and 432 (EIDN for Nth EID) to be matched against previously stored bloom filters part of different EIDs (EID1-EIDN). For each SSID match found at blocks 420, 428, 432, a respective match counter for the associated EID is incremented at blocks 422, 424, and 426. This is repeated until there are no more available SSIDs from the scan results at block 404.

At the end of the scan process, the EID with the largest counter value is selected. In at least one embodiment, this EID is called a match if the associated counter value is greater than a threshold (e.g., 50%) of the total networks discovered during the network scan 430. The processing logic can determine a match count using a maximum function of the various counter values (block 406). The total network count is the number of SSIDs discovered during the network scan 430 is determined at block 418. At block 408, the processing logic can compare the match count against the threshold based on the total network count to determine an EID match. This can be done to avoid matching SSIDs that may be present across different cities, e.g., "Xfinity." If such a match exists, the corresponding WLAN profile (SSID, security, password) is used for the connection process. If an EID match is found at block 408, the processing logic selects the WLAN profile of the corresponding EID matched (block 414), and the method 400 ends at block 416. If no EID match is found at block 408, the processing logic can generate a new EID for the physical location, which is mostly like a new place for the device (block 410). The device can prompt the user for the credentials and saves the credentials with the new EID for future use in this new environment (block 412), and the method 400 ends at block 416.

As described above, a bloom filter can be used to generate and match EIDs. The advantage of using a bloom filter to implement EID are memory, compute efficiency, and the ability to preserve privacy by not storing the names of the visible networks.

In other embodiments, the EID that uniquely identifies a physical location can be obtained using other methods. Some examples include geographical coordinates, such as those retrieved from a GPS device. A location identifier can be present in a beacon frame. In at least one embodiment, the location identifiers in the beacon frames can be used to generate EIDs that uniquely identify a physical location from another physical location. In other scenarios, there can be a change in public IP address between the two locations. In at least one embodiment, the public IP address can be used to generate EIDs that uniquely identify a physical location from another physical location. As described herein, a CRC value, such as a CRC32 hash, of the detected SSIDS can be used to detect a new location. In at least one embodiment, the wireless device 102 can use concatenated unordered CRC32 of SSIDs to generate the EID. The wireless device 102 can maintain a maximum number, N, of SSIDs to save memory and reduce the length of EID. When the number of SSIDs exceeds N, only the top N SSIDs based on Beacon Signal strength are recorded.

It should be noted that this limitation does not exist when the bloom filter implementation is used for EIDs, and all EIDs are the same n-bit length. For example, when using the bloom filter on the previous example at the first physical location with the networks ['Guest', 'foo', 'Joe12', 'Xfini', 'startlink', 'Miranda'] can result in an EID of Oxaaae (with 16-bit bloom filter which has a function murmur and FNVs). The second physical location with the networks ['Guest', 'Work', 'IO', 'Henry'] can result in an EDI of 0x401e with the same definition of bloom filter (16-bits with hash function Murmer and FNV).

For another example, when using CRC32 implementation for EID instead of the bloom filter, the first physical location with the networks ['Guest', 'foo', 'Joe12', 'Xfini', 'startlink', 'Miranda'] can result in a CRC32 EID 0x6d76b531-0x8c736521-0xf7b20f59-0x581ab4b2-0x77ac9fad-0xe-eaeafdb. The second physical location with networks ['Guest', 'Work', 'IO', 'Henry'] can result in a CRC32 EID 0x6d76b531-0xf37cc7be-0x8601bab2-0xd4c0d762. It should be noted that the CRC32 EIDS are variable in length and, in this case, are limited to top N SSIDs (based on signal strength).

It should be noted that the embodiments of detecting a change in the device operating environment could be used for other applications as well, e.g., to detect device mobility, improve network scan time by skipping unused channels, optimizing content caching and storage. For example, the network scan overhead is a dominant factor in connection time. When a device performs a network scan, it needs to look into all channels of 2.4, 5, and 6 GHz (if applicable). If the device is aware of the environment and knows that the current AP does not support higher bands, it may skip doing the network scan altogether for the 5 and 6 GHz bands.

FIG. 5 is a flow diagram of a method 500 of using EIDs to connect to a wireless network according to at least one embodiment. The method 500 may be performed by processing logic that comprises hardware (e.g., circuitry, dedicated logic, programmable logic, microcode, etc.), software, firmware, or a combination thereof. In one embodiment, the profile management logic 110 of FIG. 1 performs the method 500. In another embodiment, the wireless device 102 of FIG. 1 performs the method 500. In another embodiment, the WLAN radio 106 of FIG. 1 performs the method 500. In another embodiment, the wireless device 202 of FIG. 2A performs the method 500. Alternatively, other devices described herein can perform the method 500.

Referring to FIG. 5, the method 500 begins with the processing logic storing first data comprising a first EID unique to a first physical location, a first network name of a first wireless network, and a first password of the first wireless network. The processing logic stores second data comprising a second EID unique to a second physical location, a second network name of a second wireless network, and a second password of the second wireless network (block 504). The first network name and the second network name are the same (block 504). In at least one embodiment, the first network name is an SSID, and the second network name is the same SSID. At block 506, the processing logic generates a third EID at the first physical location. At block 508, the processing logic determines that the third EID matches the first EID. At block 510, the processing logic connects to the first wireless network using the first network name and the first password.

In a further embodiment, the processing logic discovers a first set of available wireless networks during a first scan. The processing logic generates a first value using an n-bit bloom filter using an SSID of each wireless network of the first set of available wireless networks. The first value is the first EID. The processing logic discovers a third set of available wireless networks during a second scan. The processing logic generates a second value using the n-bit bloom filter using an SSID of each wireless network of the third set of available wireless networks. The second value is the third EID.

In a further embodiment, the processing logic determines that the third EID matches the first EID by the following: incrementing a counter value associated with the n-bit bloom filter for each wireless network of the third set of available wireless networks that matches the first set of available wireless networks; determining that the counter value is greater than counter values associated with other n-bit filters for other EIDs at the end of the second network scan; and determining that the counter value is greater than a threshold percentage of a total number of wireless networks discovered in the second network scan.

In a further embodiment, the processing logic discovers a first set of available wireless networks. The processing logic generates a first value using a probabilistic data structure using the network name of each wireless network of the first set of available wireless networks. The first value is the first EID, discovering a third set of available wireless networks. The processing logic generates a second value using the probabilistic data structure using the network name of each wireless network of the third set of available wireless networks. The second value is the third EID.

In a further embodiment, the processing logic generates a fourth EID at a third physical location. The processing logic determines that the fourth EID does not match the first EID or the second EID. The processing logic connects to a third wireless network using a third network name and a third password. The processing logic stores third data including the fourth EID, the third network name, and the third password.

In a further embodiment, the processing logic discovers a first set of available wireless networks in a first network scan, generating a first CRC value for each network name of the first set of available wireless networks. The processing logic concatenates at least some of the first CRC values to obtain a first value. The first value is the first EID. The processing logic discovers a third set of available wireless networks in a second network scan. The processing logic generates a second CRC value for each network name of the third set of available wireless networks. The processing logic concatenates at least some of the second CRC values to obtain a second value. The second value is the third EID.

In a further embodiment, the processing logic generates a first value using a first geographic coordinate of the first physical location. The first value is the first EID. The processing logic generates a second value using a second geographic coordinate of the first physical location. The second value is the third EID.

Figure 6:
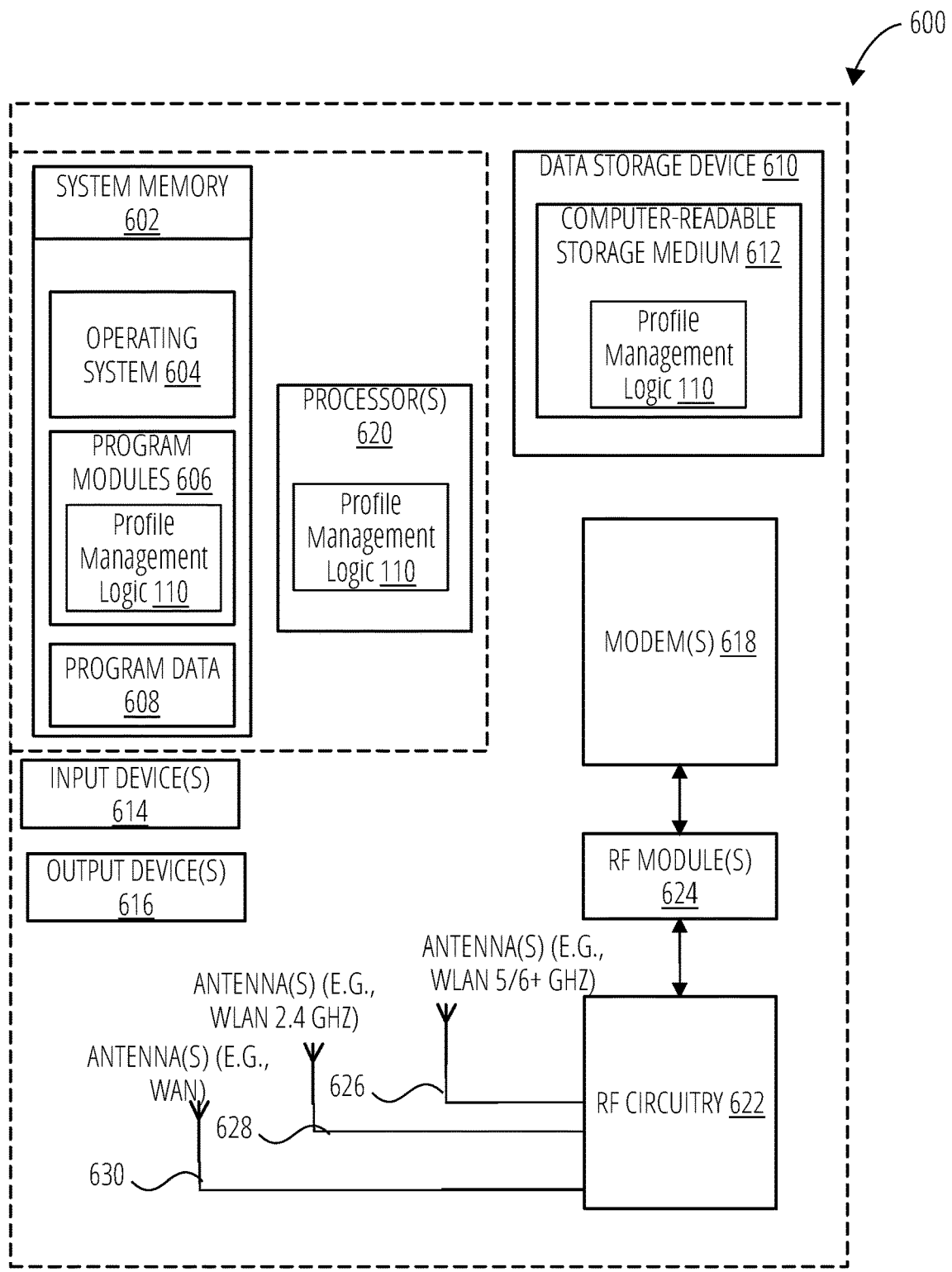
FIG. 6 is a block diagram of an electronic device with profile management logic for managing a WLAN profile with EIDs, according to at least one embodiment of the present disclosure.

FIG. 6 is a block diagram of an electronic device 600 with the profile management logic 110 for managing a WLAN profile with EIDs, according to at least one embodiment of the present disclosure. The electronic device 600 may correspond to the user devices described herein. The electronic device 600 includes one or more processor(s) 620, such as one or more central processing units (CPUs), microcontrollers, field-programmable gate arrays, or other types of processors. The electronic device 6000 also includes system memory 602, which may correspond to any combination of volatile and/or non-volatile storage mechanisms. The system memory 602 stores information that provides operating system components 604, various program modules 606, program data 608, and/or other components. The program modules 606 may include instructions of the profile management logic 110. The profile management logic 110 can perform any of the operations described herein. In one embodiment, the system memory 602 stores instructions of methods to control the operation of the electronic device 600. The electronic device 600 performs functions by using the processor(s) 620 to execute instructions provided by the system memory 602.

The electronic device 600 also includes a data storage device 610 that may be composed of one or more types of removable storage and/or one or more types of non-removable storage. The data storage device 610 includes a computer-readable storage medium 612 on which is stored one or more sets of instructions embodying any of the methodologies or functions described herein. Instructions for the program modules 606 may reside, completely or at least partially, within the computer-readable storage medium 612, system memory 602 and/or within the processor(s) 620 during execution thereof by the electronic device 600, the system memory 602, and the processor(s) 620 also constituting computer-readable media. The electronic device 600 may also include one or more input device(s) 614 (keyboard, mouse device, specialized selection keys, etc.) and one or more output device(s) 616 (displays, printers, audio output mechanisms, etc.).

The electronic device 600 further includes a modem(s) 618 to allow the electronic device 600 to communicate via wireless connections (e.g., provided by the wireless communication system) with other computing devices, such as remote computers, an item-providing system, and so forth. The modem(s) 618 can be connected to one or more radio frequency (RF) modules 624. The RF modules 624 may be a WLAN module, a WAN module, a personal area network (PAN) module, a GPS module, or the like. The antenna structures (antenna(s) 626, 628, and 630) are coupled to the RF circuitry 622, which is coupled to the modem(s) 618. The RF circuitry 622 may include radio front-end circuitry, antenna switching circuitry, impedance matching circuitry, or the like. In one embodiment, the RF circuitry 622 includes the radio frequency front-end (RFFE) circuitry with high selectivity performance as described in the various embodiments of FIG. 1 to FIG. 5. The antennas antenna 626 may be GPS antennas, NFC antennas, other WAN antennas, WLAN or PAN antennas, or the like. The modem(s) 618 allows the electronic device 600 to handle both voice and non-voice communications (such as communications for text messages, multimedia messages, media downloads, web browsing, etc.) with a wireless communication system. The modem(s) 618 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 618 may generate signals and send these signals to antenna(s) 626 of a first type (e.g., WLAN 5/6+ GHz), antenna(s) 628 of a second type (e.g., WLAN 2.4 GHz), and/or antenna(s) 630 of a third type (e.g., WAN), via RF circuitry 622, and RF module(s) 624 as described herein. Antennas 626, 628, and 630 may be configured to transmit in different frequency bands and/or using different wireless communication protocols. The antennas 626, 628, and 630 may be directional, omnidirectional, or non-directional antennas. In addition to sending data, antennas 626, 628, and 630 may also receive data, which is sent to appropriate RF modules connected to the antennas. One of the antennas 626, 628, and 630 may be any combination of the antenna structures described herein.

In one embodiment, the electronic device 600 establishes a first connection using a first wireless communication protocol and a second connection using a different wireless communication protocol. The first wireless connection and second wireless connection may be active concurrently, for example, if an electronic device is receiving a media item from another electronic device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 618 is shown to control transmission and reception via antenna (626, 628, and 630), the electronic device 600 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
a memory device that stores instructions, first data, and second data, wherein the first data comprises a first environment identifier (EID) unique to a first physical location, a first network name of a first wireless network available at the first physical location, and a first password of the first wireless network, wherein the first EID comprises a first n-bit bloom filter associated with the first physical location, wherein the first n-bit bloom filter is based on a first set of wireless networks available at the first physical location at a first time, wherein the second data comprises a second EID unique to a second physical location, a second network name of a second wireless network available at the second physical location, and a second password of the second wireless network, wherein the first network name and the second network name are the same; and
a processing device, operatively coupled to the memory device, that executes the instructions to perform operations comprising:
detecting a second set of wireless networks at the first physical location at a second time;
comparing each network name of the second set of wireless networks against the first n-bit bloom filter; and
connecting to the first wireless network using the first network name and the first password responsive to at least half of the network names of the second set of wireless networks matching any of the first set of wireless networks in the first n-bit bloom filter.

2. The wireless device of claim 1, wherein the operations further comprise generating a third EID at the first physical location, wherein generating the third EID further comprises generating a value using a second n-bit bloom filter and a network name of each wireless network of the second set of wireless networks, wherein the value is the third EID.

3. The wireless device of claim 1, wherein the operations further comprise:
incrementing a counter value associated with the first n-bit bloom filter for each network name of the second set of wireless networks that matches any of the first set of wireless networks in the first n-bit bloom filter;
determining that the counter value is greater than counter values associated with other n-bit filters associated with other physical locations; and determining that the counter value is greater than a threshold percentage of a total number of the second set of wireless networks, wherein the threshold percentage is at least fifty percent or greater.

4. The wireless device of claim 1, wherein the operations further comprise:
   detecting a third wireless network at a third physical location;
   generating a fourth EID at the third physical location;
   determining that the fourth EID does not match the first EID or the second EID;
   connecting to the third wireless network using a third network name and a third password; and
   storing third data comprising the fourth EID, the third network name, and the third password.

5. A method of operating a wireless device, the method comprising:
   storing first data comprising a first environment identifier (EID) unique to a first physical location, a first network name of a first wireless network available at the first physical location, and a first password of the first wireless network, wherein the first EID comprises a first n-bit bloom filter associated with the first physical location, wherein the first n-bit bloom filter is based on a first set of wireless networks available at the first physical location at a first time;
   storing second data comprising a second EID unique to a second physical location, a second network name of a second wireless network available at the second physical location, and a second password of the second wireless network, wherein the first network name and the second network name are the same; and
   detecting a second set of wireless networks at the first physical location at a second time;
   comparing each network name of the second set of wireless networks against the first n-bit bloom filter; and
   connecting to the first wireless network using the first network name and the first password responsive to at least half of the network names of the second set of wireless networks matching any of the first set of wireless networks in the first n-bit bloom filter.

6. The method of claim 5, further comprising generating a third EID at the first physical location, wherein generating the third EID further comprises:
   detecting a set of wireless networks at the first physical location; and
   generating a value using a second n-bit bloom filter and a network name of each wireless network of the second set of wireless networks, wherein the value is the third EID.

7. The method of claim 5, further comprising:
   incrementing a counter value associated with the first n-bit bloom filter for each network name of the second set of wireless networks that matches any of the first set of wireless networks in the first n-bit bloom filter;
   determining that the counter value is greater than counter values associated with other n-bit filters associated with other physical locations; and
   determining that the counter value is greater than a threshold percentage of a total number of the second set of wireless networks, wherein the threshold percentage is at least fifty percent or greater.

8. The method of claim 5, further comprising:
   detecting a third wireless network at a third physical location;
   generating a fourth EID at the third physical location;
   determining that the fourth EID does not match the first EID or the second EID;
   connecting to the third wireless network using a third network name and a third password; and
   storing third data comprising the fourth EID, the third network name, and the third password.

9. A wireless device comprising:
   a memory device that stores instructions; and
   a processing device, operatively coupled to the memory device, that executes the instructions to perform operations comprising:
      generating a first environment identifier (EID) unique to a first physical location, wherein the first EID is associated with a first network name of a first wireless network available at the first physical location, and a first password of the first wireless network, wherein the first EID comprises a first n-bit bloom filter associated with the first physical location, wherein the first n-bit bloom filter is based on a first set of wireless networks available at the first physical location at a first time;
      generating a second EID unique to a second physical location, wherein the second EID is associated with a second network name of a second wireless network available at the second physical location, and a second password of the second wireless network, wherein the first network name and the second network name are the same;
      detecting a second set of wireless networks at the first physical location at a second time;
      comparing each network name of the second set of wireless networks against the first n-bit bloom filter; and
      connecting to the first wireless network using the first network name and the first password responsive to at least half of the network names of the second set of wireless networks matching any of the first set of wireless networks in the first n-bit bloom filter.

10. The wireless device of claim 9, wherein the operations further comprise generating a third EID at the first physical location, wherein generating the third EID further comprises
   generating a value using a second n-bit bloom filter and a network name of each wireless network of the second set of wireless networks, wherein the value is the third EID.

11. The wireless device of claim 9, wherein the operations further comprise:
   incrementing a counter value associated with the first n-bit bloom filter for each network name of the second set of wireless networks that matches any of the first set of wireless networks in the first n-bit bloom filter;
   determining that the counter value is greater than counter values associated with other n-bit filters associated with other physical locations; and
   determining that the counter value is greater than a threshold percentage of a total number of the second set of wireless networks, wherein the threshold percentage is at least fifty percent or greater.

12. The wireless device of claim 9, wherein the operations further comprise:
   detecting a third wireless network at a third physical location;
   generating a fourth EID at the third physical location;
   determining that the fourth EID does not match the first EID or the second EID;
   connecting to the third wireless network using a third network name and a third password; and storing third data comprising the fourth EID, the third network name, and the third password.

\* \* \* \* \*